(No Model.)

J. D. BACON.
RECTAL APPLICATOR.

No. 593,318. Patented Nov. 9, 1897.

WITNESSES.
A. N. Pinney.
A. G. Pomery.

INVENTOR
James D. Bacon,
By his Atty.
Henry W. Williams

UNITED STATES PATENT OFFICE.

JAMES D. BACON, OF BOSTON, MASSACHUSETTS.

RECTAL APPLICATOR.

SPECIFICATION forming part of Letters Patent No. 593,318, dated November 9, 1897.

Application filed May 20, 1897. Serial No. 637,315. (No model.)

*To all whom it may concern:*

Be it known that I, JAMES D. BACON, a citizen of the United States, residing in Boston, in the county of Suffolk and State of Massachusetts, have invented a new and useful Rectal Applicator, of which the following is a specification.

This is a device whereby a lubricant may be applied laterally or radially therefrom to the rectum, impinging against and lubricating the walls of the rectal passage.

In carrying out my invention I provide a pipe or tube of suitable material, preferably of hard rubber, such pipe being closed at its entering end and having the passage at its rear end flared. An annular groove is formed on the tube near its closed end and radial perforations are bored in the groove and connect with the interior of the tube. A plunger or piston fits into the tube and is furnished with a suitable handle. The plunger having been removed from the tube, a lubricant, such as a preparation of lard, is inserted in the device through the outer flared end of the passage and pushed into the tube and the closed end of the instrument inserted in the rectum as far as possible, the operation being aided by a flange and annular depression, below described. The plunger is then forced up the tube, with the effect of ejecting the lubricant therefrom radially or laterally through the perforations in the annular groove and causing it to fill said groove and impinge against and lubricate the walls of the rectal passage.

The nature and operation of the invention are fully described below and illustrated in the accompanying drawings, in which—

Figure 1:
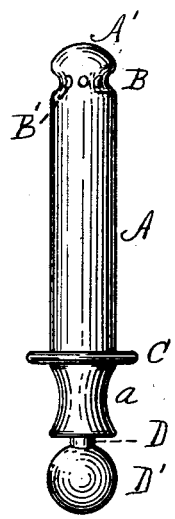
Figure 2:
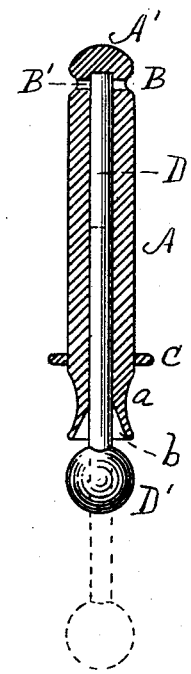

Figure 1 is an elevation or side view of my rectal douche. Fig. 2 is a longitudinal section of the same, broken lines showing the plunger or piston partially withdrawn.

Similar letters of reference indicate corresponding parts.

A represents the body of the douche, consisting of a pipe or tube closed at its forward or entering end A' and rounded at that point in order to prevent injury or discomfort when being inserted in the rectum. Next the closed end is an annular groove B, within which are a number of radial perforations B', connecting with the interior of the tube. The outer end of the passage in the tube is flared at *b*, and an annular depression *a* extends from the outer end of the tube toward an annular flange C, rigidly secured upon it. A plunger or piston D fits into the passage and is provided with a suitable handle D'. All the parts are preferably made of hard rubber.

In operation the piston D is removed and a suitable quantity of lubricant, such as a preparation of lard, is applied to the interior of the tube through the flared end *b* of the passage, such flared end serving to prevent the lubricant from getting on the outside and allowing a larger quantity to be inserted at a time. The piston D may then be used to push the lubricant toward the front end of the tube. The closed end A' is then pushed into the rectum as far as possible and the device grasped by means of the annular depression *a* and flange C and the piston pushed in by means of its handle D' until the lubricant is forced radially or laterally through the holes B' into the groove B and against the walls of the passage. As the groove B is near the entering end of the device, the lubricant is discharged very near the contents of the rectum, especially, as is frequently the case in constipation, if the fecal matter is reached by the end A' of the instrument. As the holes are not in the end of the douche, they cannot become clogged or stopped by contact with the contents of the rectum in advance of the instrument, and as they are depressed from the surface of the instrument by opening into the groove B they cannot become clogged by such of the contents as may be between the instrument and the walls of the rectal passage, especially as the groove itself is filled with lubricant expelled from the douche through said holes. As much lubricant may be delivered and applied to the walls of the rectum as desired and thus severe cases of constipation relieved and hemorrhoids and constipation prevented and cured.

Having thus fully described my invention, what I claim, and desire to secure by Letters Patent, is—

1. A rectal applicator, comprising a rigid tube closed and imperforate at its entering end and open at its opposite end, said tube being formed with an annular groove near its closed end and having radial perforations in said groove connecting with the interior of the tube; and a plunger or piston adapted to fit into said tube and force a lubricant radially or laterally through said perforations, substantially as described.

2. A rectal applicator, comprising a rigid tube closed and imperforate at its entering end and open at its opposite end, said tube being formed near its closed end with an annular groove provided with substantially radial perforations connecting with the interior of the tube, formed with the annular depression $a$ near its open end, and having the entrance to the passage therein flared at $b$; the annular flange C rigid on the tube next said depression; and a plunger or piston adapted to fit into said tube and force a lubricant through said perforations, substantially as set forth.

JAMES D. BACON.

Witnesses:
HENRY W. WILLIAMS,
A. N. BONNEY.